(12) United States Patent
Alspach et al.

(10) Patent No.: US 12,311,529 B2
(45) Date of Patent: May 27, 2025

(54) SYSTEMS AND DEVICES FOR SURFACE SLIP DETECTION

(71) Applicant: Toyota Research Institute, Inc., Los Altos, CA (US)

(72) Inventors: Alexander Alspach, Woburn, MA (US); Andrew Beaulieu, Somerville, MA (US); Avinash Uttamchandani, Cambridge, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 325 days.

(21) Appl. No.: 17/678,227

(22) Filed: Feb. 23, 2022

(65) Prior Publication Data
US 2023/0264366 A1    Aug. 24, 2023

(51) Int. Cl.
| B25J 13/08 | (2006.01) |
| B25J 9/16 | (2006.01) |
| B25J 15/00 | (2006.01) |

(52) U.S. Cl.
CPC ......... B25J 13/083 (2013.01); B25J 15/0033 (2013.01); *B25J 15/0042* (2013.01)

(58) Field of Classification Search
None
See application file for complete search history.

(56) References Cited

U.S. PATENT DOCUMENTS

| 9,226,766 B2* | 1/2016 | Aldridge ........ A61B 17/320068 |
| 9,914,212 B2 | 3/2018 | Wettels |
| 10,682,774 B2 | 6/2020 | Bingham et al. |
| 10,792,809 B2* | 10/2020 | Bingham ............... B25J 15/022 |
| 10,913,151 B1 | 2/2021 | Hinkle |
| 10,967,507 B2 | 4/2021 | Homberg et al. |
| 2002/0025278 A1* | 2/2002 | Anderson ........ G01N 27/44782 422/400 |

(Continued)

FOREIGN PATENT DOCUMENTS

WO    2020071080 A1    4/2020

OTHER PUBLICATIONS

M. R. Tremblay and M. R. Cutkosky, "Estimating friction using incipient slip sensing during a manipulation task," [1993] Proceedings IEEE International Conference on Robotics and Automation, Atlanta, GA, USA, 1993, pp. 429-434 vol. 1, doi: 10.1109/ROBOT.1993.292018. (Year: 1993).*

(Continued)

*Primary Examiner* — Thomas E Worden
*Assistant Examiner* — Atticus A Cameron
(74) *Attorney, Agent, or Firm* — DINSMORE & SHOHL LLP (57) ABSTRACT

A system includes a processor, a robotic arm comprising an end effector, wherein the end effector comprises a plurality of ridges, a sensor configured to detect vibrations from the plurality of ridges, and a memory module. The memory module stores machine-readable instructions that cause the processor to perform operations including contacting, with the plurality of ridges, a target object, detecting, with the sensor, vibrations from the plurality of ridges caused by a movement between the target object and the plurality of ridges, determining an attribute of the movement based on the detected signals, and adjusting the end effector based on the attribute of the movement.

18 Claims, 7 Drawing Sheets

(56) References Cited

U.S. PATENT DOCUMENTS

2019/0337160 A1* 11/2019 Duchaine .................. G01L 1/20

OTHER PUBLICATIONS

R. Paulsen, J. Kastka, "Effects of combined noise and vibration on annoyance", 1995; Elsevier, Journal of Sound and Vibration, vol. 181, Issue 2, Mar. 23, 1995, pp. 295-314. (Year: 1995).*
Gong D, He R, Yu J, Zuo G. A Pneumatic Tactile Sensor for Co-Operative Robots. Sensors (Basel). Nov. 10, 2017; 17(11):2592. doi:10.3390/s17112592. PMID: 29125565; PMCID: PMC5712939. (Year: 2017).*

* cited by examiner

FIG. 7

SYSTEMS AND DEVICES FOR SURFACE SLIP DETECTION

TECHNICAL FIELD

The present disclosure relates to robotic arms, and more particularly to grips for use on end effectors of robotic arms.

BACKGROUND

Robotic arms may be used to perform object manipulations tasks that humans typically perform. A variety of challenges are presented in adapting a robotic arm to manipulate an object, including how a robotic arm is to grasp an object. If an object is grasped too firmly, the object may be damaged. If an object is grasped too softly, the object may slip away from the grasp. It is thus important for a robotic arm to know whether an object is slipping to know if it properly grasping the object.

Tactile sensors can be used to monitor object interactions with the robotic arm. The implementation of biomimetic tactile sensors has been explored to estimate contact force, detect slip events, and classify the type of slip. However, biomimetic tactile sensors require a variety of components to work, such as impedance sensing electrodes, incompressible conductive fluid, an elastomeric skin surrounding the electrodes and fluid, and a hydroacoustic fluid pressure transducer. Such components may limit the use cases of the biomimetic tactile sensors. For example, a biomimetic tactile sensor may not be used for heavy objects because the pressure required to grasp an object may cause the fluid to damage the skin.

Therefore, more solutions for detecting slip along a surface of a gripper or other end effector device are desired.

SUMMARY

In accordance with one embodiment of the present disclosure, a system includes a processor, a robotic arm comprising an end effector, wherein the end effector comprises a plurality of ridges, a sensor configured to detect vibrations from the plurality of ridges, and a memory module. The memory module stores machine-readable instructions that cause the processor to perform operations including contacting, with the plurality of ridges, a target object, detecting, with the sensor, vibrations from the plurality of ridges caused by a movement between the target object and the plurality of ridges, determining an attribute of the movement based on the detected signals, and adjusting the end effector based on the attribute of the movement.

In accordance with another embodiment of the present disclosure, a robotic arm including a processor, an end effector comprising a plurality of ridges, a sensor configured to detect vibrations from the plurality of ridges, and a memory module. The memory module stores machine-readable instructions that cause the processor to perform operations including contacting, with the plurality of ridges, a target object, detecting, with the sensor, vibrations from the plurality of ridges caused by a movement between the target object and the plurality of ridges, determining an attribute of the movement based on the detected signals, and adjusting the end effector based on the attribute of the movement.

In accordance with yet another embodiment of the present disclosure, an end effector includes a plurality of ridges, a sensor configured to detect vibrations from the plurality of ridges, and a controller. The controller is configured to perform operations including contacting, with the plurality of ridges, a target object, detecting, with the sensor, vibrations from the plurality of ridges caused by a movement between the target object and the plurality of ridges, determining an attribute of the movement based on the detected signals, and adjusting the end effector based on the attribute of the movement.

Although the concepts of the present disclosure are described herein with primary reference to robotic arms, it is contemplated that the concepts will enjoy applicability to any device for griping an object.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

The embodiments disclosed herein include systems and devices for surface slip detection. In embodiments disclosed herein, a system may include a robotic arm, and the robotic arm may include an end effector having one or more grippers. One or more grippers may include ridges on their surface. When an object is grasped by the end effector and the object begins to slide (i.e., a slip event), the object may slide against the ridges causing vibrations. Depending on the design of the ridges, the slip event may create unique vibrations (e.g., movement, sound, etc.) that can identify the slip event and its attributes. The vibrations may be detected by sensors such as an inertial measurement unit (IMU) and/or a microphone. A processor may receive the data gathered by the sensors and apply a rules-based algorithm to determine the attributes of the slip event. A processor may also or instead utilize machine learning algorithms to determine the attributes of the slip event.

Figure 1:
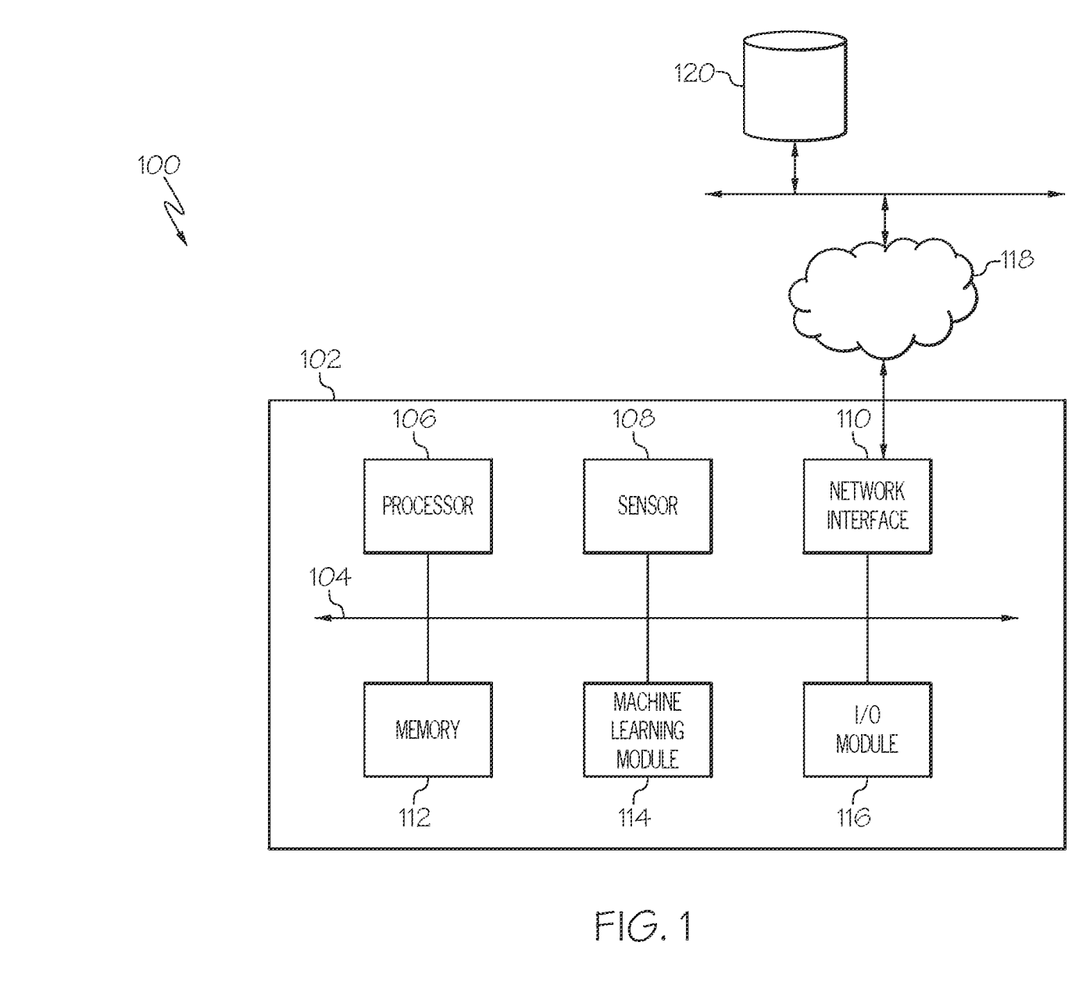
FIG. 1 schematically depicts an illustrative system having an illustrative robotic arm, according to one or more embodiments shown and described herein.

Referring now to FIG. 1, a system 100 having a robotic arm 102 is schematically depicted. The robotic arm 102 may include computing components a processor 106, a memory module 112, a network interface 110, an input/output interface (I/O interface 116), a machine learning module 114, and a sensor 108. The robotic arm 102 also may include a communication path 104 that communicatively connects the various components of the robotic arm 102. The robotic arm 102 may connect to external devices 120 via a network 118. It should be understood that the components of the robotic arm 102 described are exemplary and may contain more or less than the number of components shown.

The processor 106 may include one or more processors that may be any device capable of executing machine-readable and executable instructions. Accordingly, each of the one or more processors of the processor 106 may be a controller, an integrated circuit, a microchip, or any other computing device. The processor 106 is coupled to the communication path 104 that provides signal connectivity between the various components of the robotic arm 102. Accordingly, the communication path 104 may communicatively couple any number of processors of the processor 106 with one another and allow them to operate in a distributed computing environment. Specifically, each processor may operate as a node that may send and/or receive data. As used herein, the phrase "communicatively coupled" means that coupled components are capable of exchanging data signals with one another, such as, e.g., electrical signals via a conductive medium, electromagnetic signals via air, optical signals via optical waveguides, and the like.

The communication path 104 may be formed from any medium that is capable of transmitting a signal such as, e.g., conductive wires, conductive traces, optical waveguides, and the like. In some embodiments, the communication path 104 may facilitate the transmission of wireless signals, such as Wi-Fi, Bluetooth, Near-Field Communication (NFC), and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory module 112 is communicatively coupled to the communication path 104 and may contain one or more memory modules comprising RAM, ROM, flash memories, hard drives, or any device capable of storing machine-readable and executable instructions such that the machine-readable and executable instructions can be accessed by the processor 106. The machine-readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine-readable and executable instructions and stored on the memory module 112. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The I/O interface 116 is coupled to the communication path 104 and may contain hardware for receiving input and/or providing output. Hardware for receiving input may include devices that send information to the processor 106. For example, a keyboard, mouse, scanner, touchscreen, and camera are all I/O devices because they provide input to the processor 106. Hardware for providing output may include devices from which data is sent. For example, an electronic display, speaker, and printer are all I/O devices because they output data from the processor 106.

The robotic arm 102 may also comprise the network interface 110. The network interface 110 is communicatively coupled to the communication path 104. The network interface 110 can be any device capable of transmitting and/or receiving data via a network or other communication mechanisms. Accordingly, the network interface 110 can include a communication transceiver for sending and/or receiving any wired or wireless communication. For example, the network interface 110 may include an antenna, a modem, an Ethernet port, a Wi-Fi card, a WiMAX card, a cellular modem, near-field communication hardware, satellite communication hardware, and/or any other wired or wireless hardware for communicating with other networks and/or devices. The network interface 110 communicatively connects the robotic arm 102 to external systems, such as external devices 120, via a network 118. The network 118 may be a wide area network, a local area network, a personal area network, a cellular network, a satellite network, and the like.

The system 100 may also include external devices 120. The external devices 120 may be one or more computing devices that may be in remote communication with the robotic arm 102 via network 118. The external devices 120 may include desktop computers, laptop computers, smartphones, and any other type of computing device in communication with the robotic arm 102 to operate the robotic arm 102. The external devices 120 may also include services that operate beyond the robotic arm 102 that may be utilized by or may utilize the robotic arm 102, such as external databases, storage devices, computing platforms, and any other type of service.

The machine learning module 114 may be a hardware module coupled to the communication path 104 and communicatively coupled to the processor 106. The machine learning module 114 may also or instead be a set of instructions contained in the memory module 112. The machine learning module 114 may utilize supervised methods to train a machine learning model based on labeled training sets, wherein the machine learning model is a decision tree, a Bayes classifier, a support vector machine, a convolutional neural network, and/or the like. In some embodiments, machine learning module 114 may utilize unsupervised machine learning algorithms, such as k-means clustering, hierarchical clustering, and/or the like. The machine learning module 114 may also be configured to perform the methods described herein.

The sensor 108 may be one or more sensors communicatively coupled to the processor 106. The sensor 108 may include an inertial measurement unit (IMU). The IMU may include, for example, an accelerometer and a gyroscope. The IMU may be used to detect movement, such as vibrations resulting from the slippage of an object within the grasp of an end effector. The sensor 108 may include a microphone. The microphone may be used to detect vibrations such as sound resulting from the slippage of an object within the grasp of an end effector. The sensors of the sensor 108 may be placed anywhere on the robotic arm 102, such as at the end effectors.

It should be understood that the components illustrated in FIG. 1 are merely illustrative and are not intended to limit the scope of this disclosure. More specifically, while the components in FIG. 1 are illustrated as residing within robotic arm 102, this is a non-limiting example. In some embodiments, one or more of the components may reside external to robotic arm 102.

Figure 2:
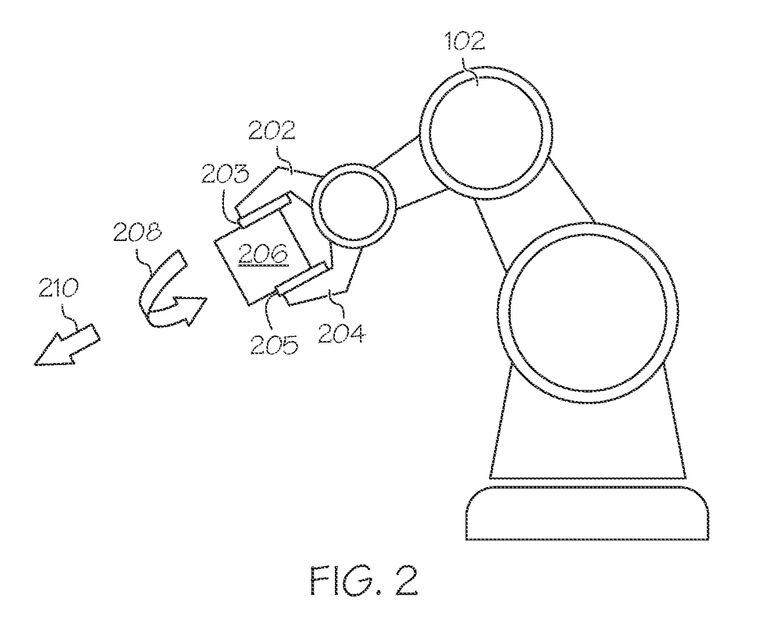
FIG. 2 depicts the illustrative robotic arm of FIG. 1 grasping an object, according to one or more embodiments shown and described herein.

Referring now to FIG. 2, the robotic arm 102 grasping an object 206 is depicted. In addition to the computing components as described in FIG. 1, the robotic arm 102 includes an end effector 202, 204 controlled by the processor 106. The end effector 202, 204 may be one or more fingers, stems, claws, and/or any other kind of tool for manipulating the environment (e.g., an object 206) around the robotic arm. Each end effector 202, 204 may include contact surfaces 203, 205 that may be one or more grips, joints, pads, and/or any other kind of tool for assisting in the manipulation of the environment around the robotic arm 102 by the end effector 204.

The object 206 shown in FIG. 2 is a cube but may be any other kind of object that may be manipulated by the robotic arm 102. For example, the object 206 may be a sphere, cylinder, pyramid, or any other shape. The object 206 may have a weight, and the robotic arm 102 may manipulate the object 206 by applying a grip strength to the end effectors 202, 204 such that the object 206 may be held in place between the end effectors 202, 204. However, applying too much grip strength may place too much pressure on the object 206, thereby causing damage to the object 206. On the other hand, applying an inadequate amount of grip strength may place inadequate pressure on the object 206, thereby causing it to slide away and/or fall from the end effectors 202, 204. For example, if an inadequate amount of grip strength is placed on the object 206, the object 206 may slide in a direction 210 away from the robotic arm. In some instances, based on the weight distribution of the object 206, the object 206 may even rotate, such as in a direction 208, around the end effectors 202, 204.

To reduce the possibility of the robotic arm 102 dropping the object 206, the robotic arm 102 may sense when the object 206 is moving. Particularly, the sensors (e.g., sensors 108) of the robotic arm 102 may detect a slip between the object 206 and the end effectors 202, 204. When a slip begins to occur between the object 206 and the end effectors 202, 204, whether in directions 208, 210, or any other direction, the slip movement may create a sound or other vibration due to the contact of the object 206 with the end effectors 202, 204. The degree or type of slip may be reflected in the degree or type of sounds and/or vibrations created. To improve the detection of a slip event and the direction of the slip, unique ridges (e.g., a fingerprint) may be implemented on a contact surface 203, 205 of one or more end effectors 202, 204 so that an inertial measurement unit or similar sensors can detect and identify unique vibrations during a slip event caused by movement over the unique ridges on the contact surface 203, 205 of the one or more end effectors 202, 204. In some embodiments, the ridges may be configured to permit certain types of slip by reducing the amount of sound and/or vibrations created when the particular type of slip occurs. In some embodiments, the contact surface 203, 205 may be the membrane for a deformable bubble gripper and the like. Various configurations of ridges will be discussed in detail with respect to FIGS. 3A-5B. However, it should be understood that the ridges discussed in FIGS. 3A-5B are exemplary and that other possible configurations are contemplated.

Figure 3A:
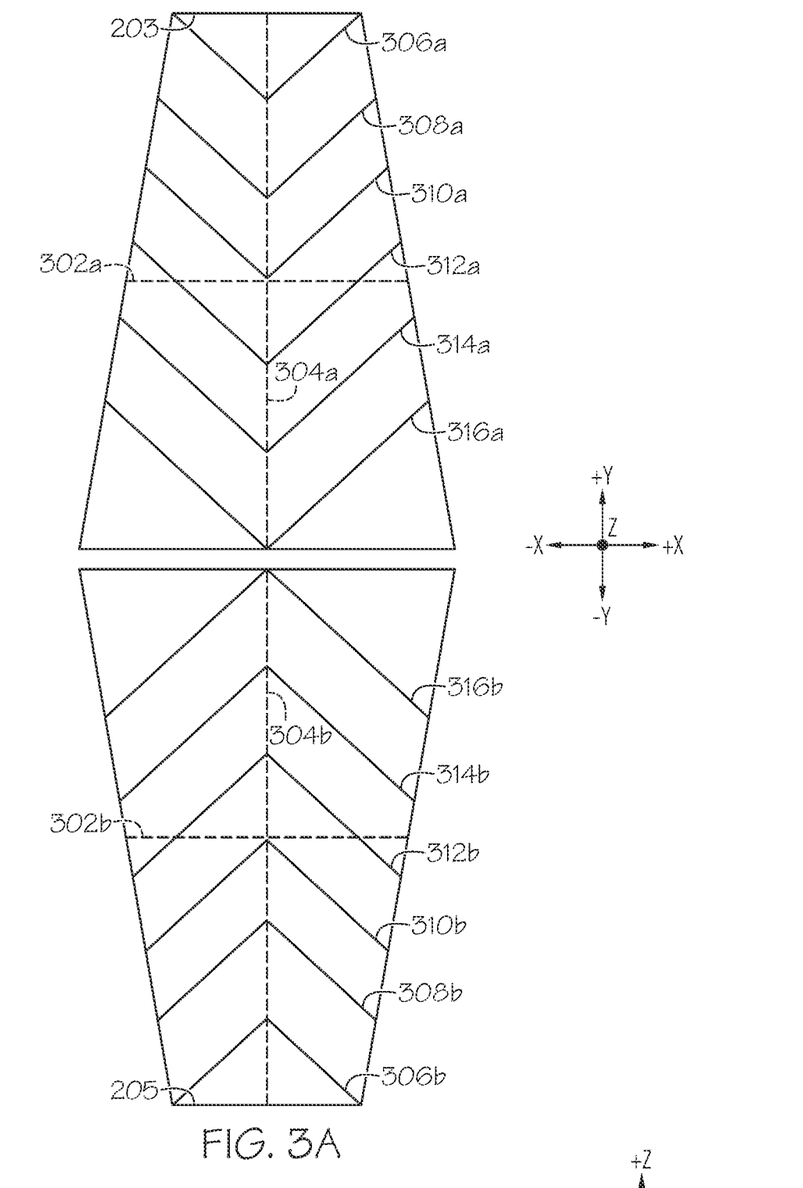
FIG. 3A depicts a top view of an illustrative plurality of ridges, according to one or more embodiments shown and described herein.

Referring now to FIG. 3A, a top view of a plurality of ridges 306-316 is depicted. The plurality of ridges 306a-316a, 306b-316b (collectively, "the plurality of ridges 306-316") may be placed on a contact surface 203, 205 of an end effector 202, 204 such that the one or more of the plurality of ridges 306-316 comes in contact with the object 206 when the object 206 is grasped by the robotic arm 102. The plurality of ridges 306a-316a may be on the contact surface 203 and the plurality of ridges 306b-316b may be on the contact surface 205. The contact surfaces 203, 205 may be arranged such that the +Y end of centerline 304a and the −Y end of centerline 304b are furthest from the robotic arm 102 and the −Y end of centerline 304a and the +Y end of centerline 304b are closest to the robotic arm 102. The plurality of ridges 306-316 may be arranged such that they each extend in a +Z direction away from the contact surface 203, 205. It should be noted that greater or fewer than six ridges may be placed on each contact surface 203, 205.

The plurality of ridges 306-316 may be made of any suitable material. For example, the plurality of ridges 306-316 may be made of rubber to improve the grip of the contact surfaces 203, 205. Other suitable materials may include plastics. In some embodiments, the plurality of ridges 306-316 may comprise multiple materials. The plurality of ridges 306-316 may be made from the same or different material as the contact surfaces 203, 205. For example, the plurality of ridges 306-316 may be made of rubber, whereas the contact surfaces 203, 205 may be made from metal. As another example, both the plurality of ridges 306-316 and the contact surfaces 203, 205 may be made from plastic. When both the plurality of ridges 306-316 and the contact surfaces 203, 205 are made from the same material, in some embodiments, the contact surfaces 203, 205 may form the plurality of ridges 306-316 such that the contact surfaces 203, 205 and its corresponding plurality of ridges 306-316 are formed from a single piece of material.

The thickness of the plurality of ridges 306-316 may be uniform among each ridge. For example, each ridge of the plurality of ridges 306-316 may have a uniform thickness of 1 mm or any other thickness. In some embodiments, the thickness of the plurality of ridges 306-316 may vary among each ridge. For example, the ridges may gradually become thicker as they get closer to the robotic arm 102 (e.g., in the −Y direction for the contact surface 203 and the +Y direction for the contact surface 205) such that ridge 316 is thicker than ridge 306. The ridges may also or instead gradually become thicker based on their distance from the centerlines 302, 304. Because the plurality of ridges 306-316 are symmetrical around the centerline 304, each ridge of the plurality of ridges 306-316 may become thicker as they move away from the centerline 304 or vice versa. For example, the ridge 316a may become thicker as the ridge 316a gets further from the centerline 304a in the X direction. As another example, ridge 316b may become thicker as the ridge 316b gets closer to the centerline 304b in the X direction.

The shape of the plurality of ridges 306-316 may be straight lines extending from the centerline 304. The shape of the plurality of ridges 306-316 may also or instead be non-straight lines extending from the centerline 304. The ridges of the plurality of ridges 306-316 may extend from the centerline 304 to the end of the contact surface 203, 205. The plurality of ridges 306-316 may be uniformly distributed on the contact surface 203, 205. For example, the plurality of ridges 306-316 may be evenly spaced apart from each other and/or symmetric like the plurality of ridges 306-316. In some embodiments, the plurality of ridges may be non-uniformly distributed on the contact surface. For example, the plurality of ridges 306-316 may be asymmetric on one or more centerlines 302, 304. As another example, the plurality of ridges 306-316 may be more grouped together on one end of the contact surface 203, 205 (e.g., on the +Y end of the contact surface 203 and the −Y end of the contact surface 205) and more spaced apart on the other end of the contact surface 203, 205 (e.g., on the −Y end of the contact surface 203 and the +Y end of the contact surface 205). A non-uniform distribution may help further customize the kind of vibration or sound response caused by a particular type of slip. For example, it may be easier for the robotic arm 102 to determine that the object 206 is slipping out of its grasp when the vibration and/or sound intensifies because of a tighter grouping of ridges on the end of the contact surface 203, 205 furthest from the robotic arm 102.

The plurality of ridges 306-316 may be non-parallel with the centerline 302 and/or the centerline 304. That is, each ridge of the plurality of ridges 306-316 may have a bend, curve, groove, or any other kind of angle. For example, each ridge of the plurality of ridges 306-316 forms an acute angle with itself at the centerline 304. An angle in each ridge of the plurality of ridges 306-316 may make certain types of slip more difficult and thus may create different vibrations and/or sounds to make certain types of slip more easily identifiable. For example, the angle formed by each ridge in the plurality of ridges 306-316 may make slips in the +Y direction of contact surface 203 and the −Y direction of contact surface 205 more difficult, and thus when a slip in that direction occurs, the vibrations and/or sounds may be amplified. In some embodiments, the plurality of ridges 306-316 may be parallel with the centerline 302 and/or 304. For example, if the plurality of ridges 306-316 are parallel with the centerline 302, it may be difficult for the object 206 to slip in the Y direction but easy to slip in the X direction. As another example, if the plurality of ridges 306-316 are parallel with the centerline 302, it may be difficult for the object 206 to slip in the X direction but easy to slip in the Y direction. The plurality of ridges 306-316 may be parallel in any direction to allow for certain types of slips to be permissible due to the lack of resistance created by the plurality of ridges 306-316 in that direction. It should be understood that each ridge of the plurality of ridges 306-316 may be any kind of line (e.g., straight, curved, angled, and the like) and each ridge does not necessarily need to have the same shape as each other ridge. It should also be understood that any examples provided indicating a particular direction may be applied to any other direction. For example, the plurality of ridges 306-316 are not limited to strictly the X or Y direction but may have any direction therebetween.

Figure 3B:
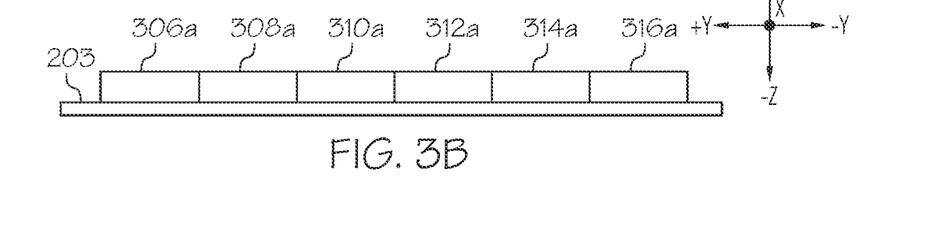
FIG. 3B depicts a side view of the illustrative plurality of ridges of FIG. 3B, according to one or more embodiments shown and described herein.

Referring now to FIG. 3B, a side view of the plurality of ridges 306a-316a is depicted. The contact surface 205 may be a mirror image of the contact surface 203, and thus only the contact surface 203 and the plurality of ridges 306a-316a is shown. FIG. 3B depicts the plurality of ridges 306a-316a as a group of lines extending from a contact surface 203 of the end effector 202. The plurality of ridges 306a-316a may be separate pieces of material from each other and the contact surface 203. The contact surface 203 may also be a separate material from its corresponding end effector 202.

For example, the end effector 202 may be constructed from metal, the contact surface 203 may be constructed from plastic, and the plurality of ridges 306a-316a may be constructed from rubber.

The height of the plurality of ridges 306a-316a may also be greater than the height of the contact surface 203, although it may not necessarily be so. Although FIG. 3B depicts the height of the plurality of ridges 306a-316a as being greater than their thickness, the height of the plurality of ridges 306a-316a may be different between embodiments. The plurality of ridges 306a-316a may be uniform in height. In some embodiments, however, the height of the plurality of ridges 306a-316a may vary. For example, the plurality of ridges 306a-316a may gradually decrease in height such that the ridge 306a is taller than the ridge 316a.

Figure 4A:
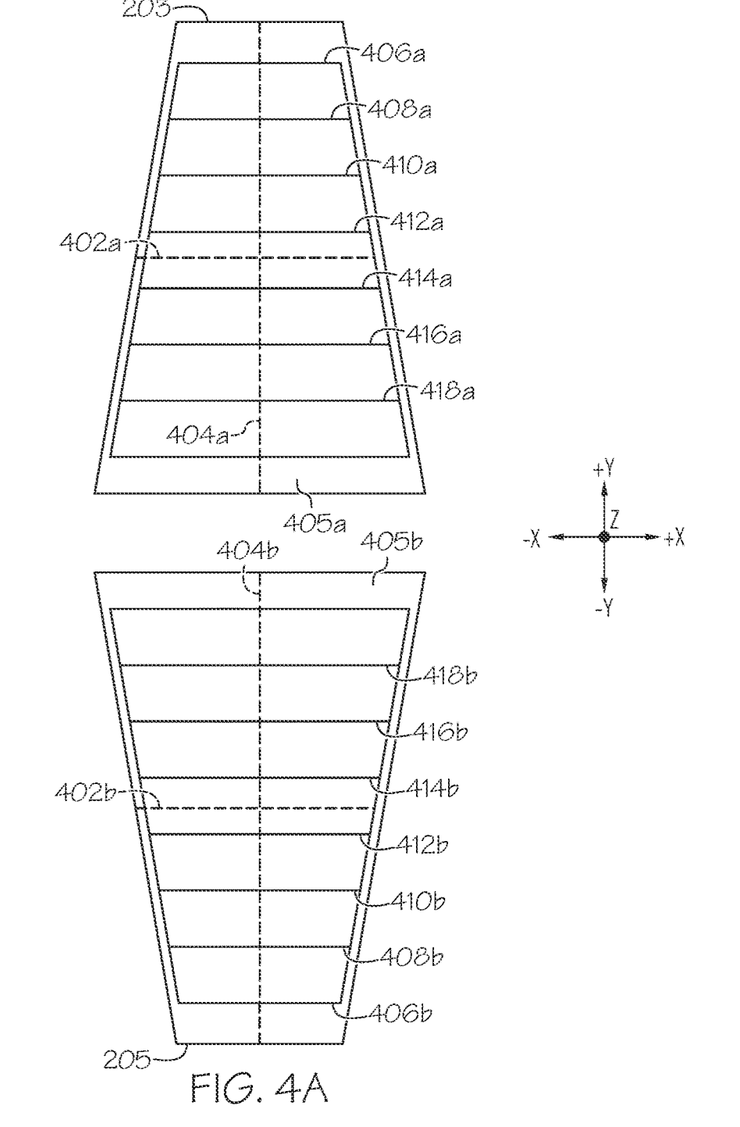
FIG. 4A depicts a top view of another illustrative plurality of ridges, according to one or more embodiments shown and described herein.

Referring now to FIG. 4A, a top view of a plurality of ridges is depicted. The plurality of ridges 406a-418a, 406b-418b (collectively, "the plurality of ridges 406-418") may be placed on the contact surface 203, 205 of the end effector 202, 204 such that the one or more of the plurality of ridges 406-418 comes in contact with the object 206 when the object 206 is grasped by the robotic arm 102. The plurality of ridges 406a-418a may be on the contact surface 203 and the plurality of ridges 406b-418b may be on the contact surface 205. The contact surfaces 203, 205 may be arranged such that the +Y end of centerline 404a and the −Y end of centerline 404b are furthest from the robotic arm 102 and the −Y end of centerline 404a and the +Y end of centerline 404b are closest to the robotic arm 102. The plurality of ridges 406-418 may be arranged such that they each extend in a +Z direction away from the contact surface 203, 205. It should be noted that greater or fewer than seven ridges may be placed on each contact surface 203, 205.

Figure 4B:
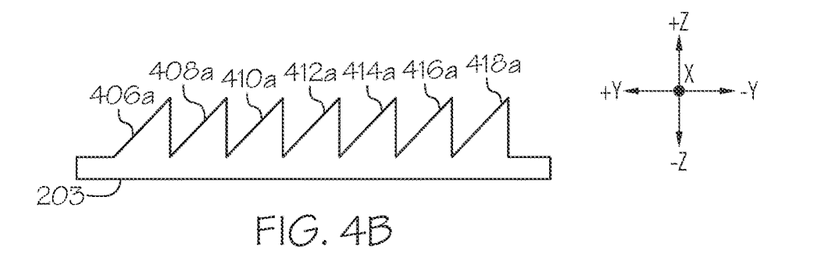
FIG. 4B depicts a side view of the another illustrative plurality of ridges of FIG. 4A, according to one or more embodiments shown and described herein.

The plurality of ridges 406-418 may be made of any suitable material. For example, the plurality of ridges 406-418 may be made of rubber to improve the grip of the contact surfaces 203, 205. Other suitable materials may include plastics. In some embodiments, the plurality of ridges 406-418 may comprise multiple materials. The plurality of ridges 406-418 may be made from the same or different material as the contact surfaces 203, 205. For example, the plurality of ridges 406-418 and the contact surfaces 203, 205 may be made from rubber. When both the plurality of ridges 406-418 and the contact surfaces 203, 205 are made from the same material, as shown in FIGS. 4A, 4B, the contact surfaces 203, 205 may form the plurality of ridges 406-418 such that the contact surfaces 203, 205 and its corresponding plurality of ridges 406-418 are formed from a single piece of material.

The thickness of the plurality of ridges 406-418 may be uniform among each ridge. In some embodiments, the thickness of the plurality of ridges 406-418 may vary among each ridge. For example, the ridges may gradually become thicker as they get closer to the robotic arm 102 (e.g., in the −Y direction for the contact surface 203 and the +Y direction for the contact surface 205) such that ridge 418 is thicker than ridge 406. The ridges may also or instead gradually become thicker based on their distance from the centerlines 402, 404. Because the plurality of ridges 406-418 are symmetrical around the centerline 404, each ridge of the plurality of ridges 406-418 may become thicker as they move away from the centerline 404 or vice versa. For example, the ridge 418a may become thicker as the ridge 418a gets further from the centerline 404a in the X direction. As another example, ridge 418b may become thicker as the ridge 418b gets closer to the centerline 404b in the X direction.

The shape of the plurality of ridges 406-418 may be straight lines extending from the centerline 404. The shape of the plurality of ridges 406-418 may also or instead be non-straight lines extending from the centerline 404. The ridges of the plurality of ridges 406-418 may extend from the centerline 404 to the end of the contact surface 203, 205. The plurality of ridges 406-418 may be uniformly distributed on the contact surface 203, 205. For example, the plurality of ridges 406-418 may be evenly spaced apart from each other and/or symmetric like the plurality of ridges 406-418. In some embodiments, the plurality of ridges may be non-uniformly distributed on the contact surface. For example, the plurality of ridges 406-418 may be asymmetric on one or more centerlines 402, 404. As another example, the plurality of ridges 406-418 may be more grouped together on one end of the contact surface 203, 205 (e.g., on the +Y end of the contact surface 203 and the -Y end of the contact surface 205) and more spaced apart on the other end of the contact surface 203, 205 (e.g., on the -Y end of the contact surface 203 and the +Y end of the contact surface 205). A non-uniform distribution may help further customize the kind of vibration or sound response caused by a particular type of slip. For example, it may be easier for the robotic arm 102 to determine that the object 206 is slipping out of its grasp when the vibration and/or sound intensifies because of a tighter grouping of ridges on the end of the contact surface 203, 205 furthest from the robotic arm 102.

The plurality of ridges 406-418 may be non-parallel with the centerline 402 and/or the centerline 404. That is, each ridge of the plurality of ridges 406-418 may have a bend, curve, groove, or any other kind of angle. For example, each ridge of the plurality of ridges 406-418 forms an acute angle with itself at the centerline 404. An angle in each ridge of the plurality of ridges 406-418 may make certain types of slip more difficult and thus may create different vibrations and/or sounds to make certain types of slip more easily identifiable. For example, the angle formed by each ridge in the plurality of ridges 406-418 may make slips in the +Y direction of contact surface 203 and the -Y direction of contact surface 205 more difficult, and thus when a slip in that direction occurs, the vibrations and/or sounds may be amplified. In some embodiments, the plurality of ridges 406-418 may be parallel with the centerline 402 and/or 404. For example, if the plurality of ridges 406-418 are parallel with the centerline 402, it may be difficult for the object 206 to slip in the Y direction but easy to slip in the X direction. As another example, if the plurality of ridges 406-418 are parallel with the centerline 402, it may be difficult for the object 206 to slip in the X direction but easy to slip in the Y direction. The plurality of ridges 406-418 may be parallel in any direction to allow for certain types of slips to be permissible due to the lack of resistance created by the plurality of ridges 406-418 in that direction. It should be understood that each ridge of the plurality of ridges 406-418 may be any kind of line (e.g., straight, curved, angled, and the like) and each ridge does not necessarily need to have the same shape as each other ridge. It should also be understood that any examples provided indicating a particular direction may be applied to any other direction. For example, the plurality of ridges 406-418 are not limited to strictly the X or Y direction but may have any direction therebetween.

Referring now to FIG. 4B, a side view of the plurality of ridges 406a-418a is depicted. The contact surface 205 may be a mirror image of the contact surface 203, and thus only the contact surface 203 and the plurality of ridges 406a-418a are shown. FIG. 4B depicts the plurality of ridges 406a-418a as a group of lines extending from a contact surface 203 of the end effector 202. The plurality of ridges 406a-418a and the contact surface 203 may be a single piece of material. For example, the contact surface 203 and the plurality of ridges 406a-418a may be constructed from a single piece of rubber.

The height of the plurality of ridges 406a-418a may also be greater than the height of the contact surface 203, although it may not necessarily be so. The height of the plurality of ridges 406a-418a may be different between embodiments. The plurality of ridges 406a-418a may be uniform in height. In some embodiments, however, the height of the plurality of ridges 406a-418a may vary. For example, the plurality of ridges 406a-418a may gradually decrease in height such that the ridge 406a is taller than the ridge 418a.

The shape of the plurality of ridges 406a-418a from the side view of FIG. 4B may be a saw wave pattern. A saw wave pattern may provide a ratcheting effect so that slip of the object 206 may happen in one direction but may be more difficult in another. For example, the saw wave pattern of the plurality of ridges 406a-418a makes slip in the +Y direction more difficult while allowing for slip in the -Y direction due to the increasing height of each ridge in the -Y direction. This principle may be applied in any direction to control the directionality of the ratcheting effect. In addition to or instead of a saw wave pattern, the plurality of ridges 406a-418a may have a sine wave, square wave, triangle wave, or any other kind of wave pattern, uniform or non-uniform.

Figure 5A:
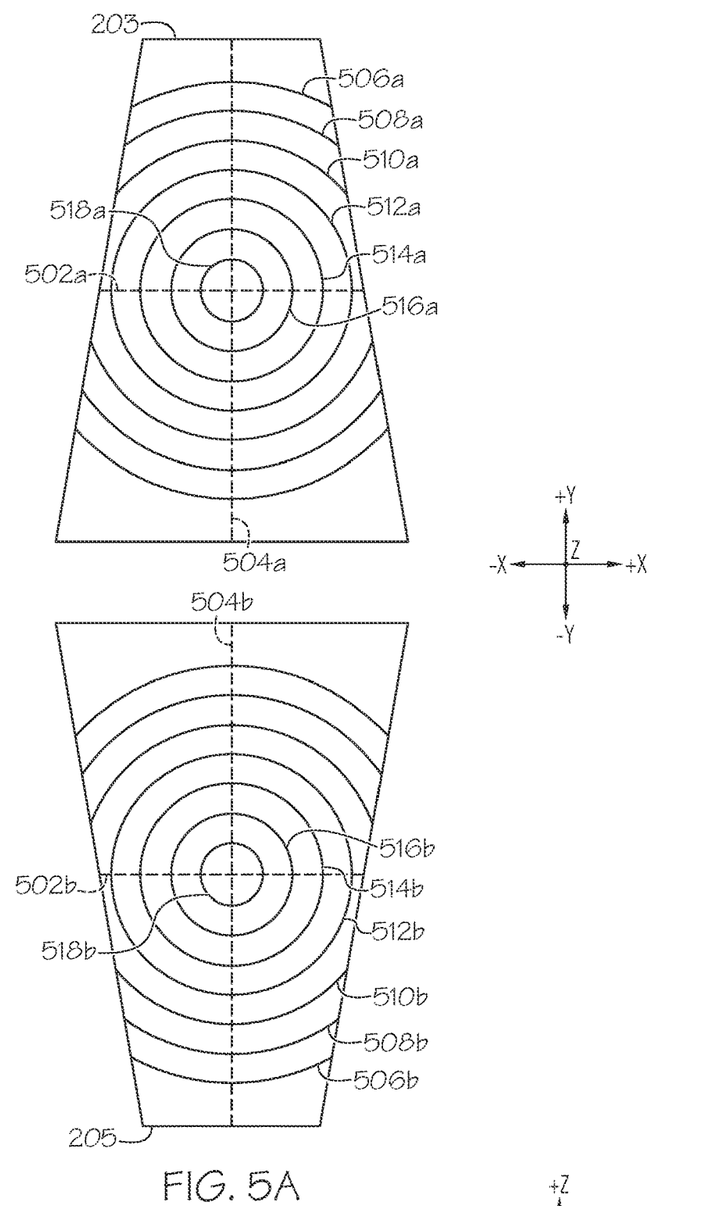
FIG. 5A depicts a top view of yet another illustrative plurality of ridges, according to one or more embodiments shown and described herein.

Referring now to FIG. 5A, a top view of a plurality of ridges is depicted. The plurality of ridges 506a-518a, 506b-518b (collectively, "the plurality of ridges 506-518") may be placed on a contact surface 203, 205 of an end effector 202, 204 such that the one or more of the plurality of ridges 506-518 comes in contact with the object 206 when the object is grasped by the robotic arm 102. The plurality of ridges 506a-518a may be on the contact surface 203 and the plurality of ridges 506b-518b may be on the contact surface 205. The contact surfaces 203, 205 may be arranged such that the +Y end of centerline 304a and the -Y end of centerline 304b are furthest from the robotic arm 102 and the -Y end of centerline 304a and the +Y end of centerline 304b are closest to the robotic arm 102. The plurality of ridges 506-518 may be arranged such that they each extend in a +Z direction away from the contact surface 203, 205. It should be noted that greater or fewer than seven ridges may be placed on each contact surface 203, 205.

The plurality of ridges 506-518 may be made of any suitable material. For example, the plurality of ridges 506-518 may be made of rubber to improve the grip of the contact surfaces 203, 205. Other suitable materials may include plastics. In some embodiments, the plurality of ridges 506-518 may comprise multiple materials. The plurality of ridges 506-518 may be made from the same or different material as the contact surfaces 203, 205. For example, the plurality of ridges 506-518 may be made of rubber, whereas the contact surfaces 203, 205 may be made from metal. As another example, both the plurality of ridges 506-518 and the contact surfaces 203, 205 may be made from plastic. When both the plurality of ridges 506-518 and the contact surfaces 203, 205 are made from the same material, in some embodiments, the contact surfaces 203, 205 may form the plurality of ridges 506-518 such that the contact surfaces 203, 205 and its corresponding plurality of ridges 506-518 are formed from a single piece of material.

The thickness of the plurality of ridges 506-518 may be uniform among each ridge. For example, each ridge of the plurality of ridges 506-518 may have a uniform thickness of 1 mm or any other thickness. In some embodiments, the thickness of the plurality of ridges 506-518 may vary among each ridge. For example, the ridges may gradually become thicker as they get closer to the center of the contact surface 203, 205 (e.g., at the intersection of centerlines 502a, 504a and 502b, 504b) such that ridge 518 is thicker than ridge 506.

The plurality of ridges 506-518 may be concentric shapes extending from the contact surface 203, 205 of the end effector 202, 204. The plurality of ridges 506-518 may be uniformly distributed on the contact surface 203, 205. For example, the plurality of ridges 506-518 may be evenly spaced apart from each other and/or symmetric like the plurality of ridges 506-518. In some embodiments, the plurality of ridges may be non-uniformly distributed on the contact surface. For example, the plurality of ridges 506-518 may be more grouped together towards the ends of the contact surface 203, 205 and more spaced apart towards the center of the contact surface 203, 205 (e.g., at the intersection of centerlines 502a, 504a and 502b, 504b). A non-uniform distribution may help further customize the kind of vibration or sound response caused by a particular type of slip. For example, it may be easier for the robotic arm 102 to determine that the object 206 is slipping out of its grasp when the vibration and/or sound intensifies because of a tighter grouping of ridges on the end of the contact surface 203, 205 furthest from the robotic arm 102.

A shape of the plurality of ridges 506-518 may make certain types of slip more difficult but also permit reorientation. For example, the circles formed by each ridge in the plurality of ridges 506-518 may make slips in the +Y direction of contact surface 203 and the -Y direction of contact surface 205 more difficult, yet torsional movement to reorient the object 206 (e.g., in a direction 208) may be permissible with this pattern of ridges. It should be understood that each ridge of the plurality of ridges 506-518 may be any kind of shape (e.g., circle, ellipse, and the like) and each ridge does not necessarily need to have the same shape as each other ridge. For example, the plurality of ridges 506-518 having an ellipse shape may be longer in the Y direction than the X direction. It should also be understood that any examples provided indicating a particular direction may be applied to any other direction.

Figure 5B:
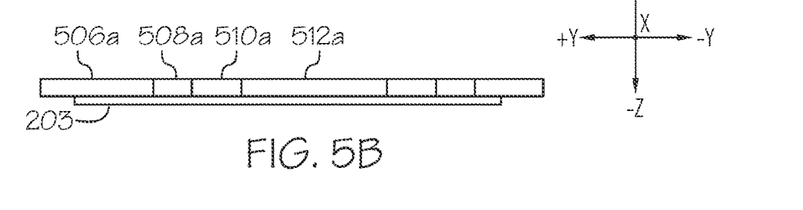
FIG. 5B depicts a side view of the yet another illustrative plurality of ridges of FIG. 5A, according to one or more embodiments shown and described herein.

Referring now to FIG. 5B, a side view of the plurality of ridges is depicted. The contact surface 205 may be a mirror image of the contact surface 203, and thus only the contact surface 203 and the plurality of ridges 506a-518a is shown. FIG. 5B depicts the plurality of ridges 506a-518a as a group of concentric circles extending from a contact surface 203 of the end effector 202. The plurality of ridges 506a-518a may be separate pieces of material from each other and the contact surface 203. The contact surface 203 may also be a separate material from its corresponding end effector 202. For example, the end effector 202 may be constructed from metal, the contact surface 203 may be constructed from plastic, and the plurality of ridges 506a-518a may be constructed from rubber.

The height of the plurality of ridges 506a-518a may also be greater than the height of the contact surface 203, although it may not necessarily be so. Although FIG. 5B depicts the height of the plurality of ridges 506a-518a as being greater than their thickness, the height of the plurality of ridges 506a-518a may be different between embodiments. The plurality of ridges 506a-518a may be uniform in height. In some embodiments, however, the height of the plurality of ridges 506a-518a may vary. For example, the plurality of ridges 506a-518a may gradually decrease in height such that the ridge 506a is taller than the ridge 518a.

Figure 6:
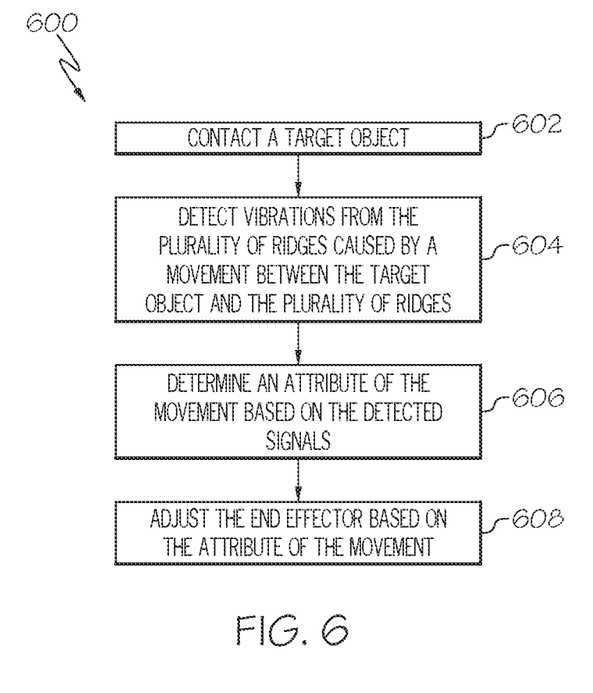
FIG. 6 depicts a flow chart of an illustrative method, according to one or more embodiments shown and described herein.

Referring now to FIG. 6, a flow chart of a method 600 is depicted. The method 600 may be performed by the system 100 having the robotic arm 102. The memory module 112 may include machine-readable instructions that cause the processor 106 to perform steps 602-608. In step 602, the robotic arm 102 may contact a target object, such as the object 206. The robotic arm 102 may include a plurality of ridges on a contact surface 203, 205 and/or the end effector 202, 204. The plurality of ridges may be designed according to the examples shown in FIGS. 3A-5B or any other design. The plurality of ridges may create vibrations when a slip occurs between the object 206 and the robotic arm 102.

In step 604, the system 100 detects vibrations from the plurality of ridges caused by a movement between the object 206 and the plurality of ridges. The vibrations may be movement, sound, and/or any other kind of vibration. Detecting movement may be performed by an IMU of the sensor 108. Detecting sound may be performed by a microphone of the sensor 108. The frequency and/or intensity of the vibrations may be controlled by the configuration of the ridges on the contact surfaces of the robotic arm 102. For example, ridges grouped closer together may have a higher frequency of vibrations than ridges grouped further apart, and taller ridges may have a higher intensity of vibrations than shorter ridges.

In step 606, the system 100 determines an attribute of the movement based on the detected signals. The attribute may include a direction and/or a magnitude of the movement. For example, the plurality of ridges on a contact surface may be configured such that the frequency and/or intensity of vibrations created by a slip movement between the object 206 and the plurality of ridges may increase in a particular direction to indicate that the slip is occurring the particular direction. The plurality of ridges may also be configured to permit certain types of movement. That is, the plurality of ridges may be configured to reduce the amount of vibrations that are created for a particular type of movement. For example, the configuration as shown in FIG. 5A may permit rotational movements but not slip movements in an X or Y direction or any direction therebetween. In some embodiments, the robotic arm 102 may add vibration upon detection of the movement. Adding vibration, such as a signal sweep, may further amplify one or more of the vibrations created by the movement. Adding vibrations may also help the system 100 determine attributes such as the quality of contact between the contact surfaces 203, 205 and the object 206, for example. In some embodiments, the microphone of the sensor 108 may include beam forming to cancel out ambient noises to receive a cleaner signal and thus make a better determination of an attribute of the movement.

In step 608, the system 100 adjusts the end effector 202, 204 based on the attribute of the movement. The attribute may be a direction and/or a magnitude of the movement as well as a type of the movement (e.g., slip or rotation) as determined in step 606. Based on the attribute, the system 100 may determine an appropriate response. For example, if the object 206 is slipping when it should not be, the system 100 may direct the robotic arm 102 to tighten its grip with the end effectors 202, 204; conversely, if the object 206 is not slipping when it should be, the system 100 may direct the robotic arm 102 to loosen its grip with the end effectors 202, 204. Other adjustments may include rotating the end effectors 202, 204, moving the end effectors 202, 204 by moving the robotic arm 102, reconfiguring the plurality of ridges, and/or any other kind of adjustment to the end effectors 202, 204. In some embodiments, the system 100 may further include a motor, a speaker, or any other device for creating a vibration. The adjustment may further include applying a vibration created by an output device for creating a vibration to combine with the plurality of ridges to generate a motion in the object 206. For example, a saw wave configuration of the plurality of ridges, such as the plurality of ridges of FIG. 4A, may be combined with vibrations to move the object 206 in the direction of the plurality of ridges (e.g., the −Y direction of contact surface 203 and the +Y direction of the contact surface 205).

Figure 7:
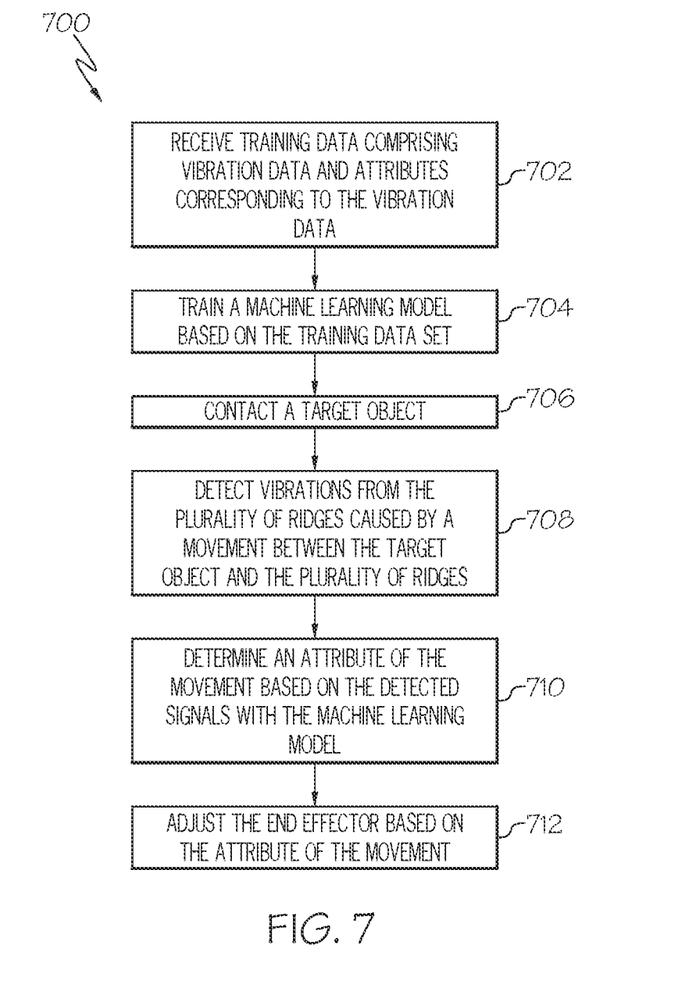
FIG. 7 depicts a flow chart of another illustrative method, according to one or more embodiments shown and described herein.

Referring now to FIG. 7, a flow chart of a method 700 is depicted. The method 700 may be performed by the system 100 having the robotic arm 102. The memory module 112 may include machine-readable instructions that cause the processor 106 to perform steps 702-712. In step 702, the system 100 receives a training data set for training the machine learning module 114. The training data set may be received via the I/O interface 116 and/or the network interface 110. The training data set may comprise a plurality of vibration data and a plurality of attributes corresponding to the plurality of vibration data. The training data may contain a plurality of features and may be a labeled data set for training a supervised machine learning model. The machine learning model may include neural networks, Naïve Bayes, linear regression, logistic regression, support vector machines, and any other supervised machine learning algorithm.

In step 704, the machine learning module 114 trains a machine learning model based on the training data set. As the machine learning module 114 receives the training data set, the machine learning model may adjust a set of weights until the model has been fitted appropriately according to the labeled training data set. Training may also or instead include determining a loss function through a gradient descent process, determining a cost function, constructing a decision boundary hyperplane, and/or any other mathematical function. The trained machine learning model may classify data into any number of categories corresponding to the features of the training data set.

Steps 706 and 708 are performed substantially similarly to steps 602 and 604, respectively, as described above, and thus will not be restated.

In step 710, the system 100 determines an attribute of the movement based on the detected signals. The detected signals may be sent to the machine learning module 114 to feed to the trained machine learning model as input. The trained machine learning model may classify the detected signals based on the training data set and output one or more attributes of the movement that created the detected signals. For example, the machine learning model may be trained on multiple movements with known slip attributes and label them as having a particular magnitude of slip, and when the trained machine learning model receives a sensor data indicating the particular magnitude, the trained machine learning model may output an indication that the movement has a slip attribute.

Step 712 is performed substantially similarly to step 608, as described above, and thus will not be restated.

It should now be understood that embodiments disclosed herein include systems and devices for surface slip detection. In embodiments disclosed herein, a system may include a robotic arm, and the robotic arm may include an end effector having one or more grippers. One or more grippers may include ridges on their surface. When an object is grasped by the end effector and the object begins to slide (i.e., a slip event), the object may slide against the ridges causing vibrations. Depending on the design of the ridges, the slip event may create unique vibrations (e.g., physical vibrations, sound, etc.) that can identify the slip event and its attributes. The vibrations may be detected by sensors such as an IMU and/or a microphone. A processor may receive the data gathered by the sensors and apply a rules-based algorithm to determine the attributes of the slip event. A processor may also or instead utilize machine learning algorithms to determine the attributes of the slip event.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open-ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A system comprising:
a processor;

a robotic arm comprising an end effector, wherein the end effector comprises a plurality of ridges, wherein a thickness of the plurality of ridges varies along at least one axis;

a sensor configured to detect vibrations from the plurality of ridges;

an output device configured to produce vibrations within the end effector; and a non-transitory memory module storing machine-readable instructions that cause the processor to perform operations comprising:

contacting, with the plurality of ridges, a target object;

outputting the vibration from the output device to amplify the vibrations from the plurality of ridges;

detecting, with the sensor, vibrations from the plurality of ridges caused by a movement between the target object and the plurality of ridges;

determining an attribute of the movement based on the detected signals; and adjusting the end effector based on the attribute of the movement.

2. The system of claim 1, wherein the plurality of ridges are concentric shapes extending from a surface of the end effector.

3. The system of claim 1, wherein the plurality of ridges are waves extending from a surface of the end effector.

4. The system of claim 1, wherein the plurality of ridges are a non-uniformly distributed group of lines extending from a surface of the end effector.

5. The system of claim 1, wherein the plurality of ridges are a uniformly distributed group of lines extending from a surface of the end effector.

6. The system of claim 1, wherein a surface of the end effector forms the plurality of ridges.

7. The system of claim 1, wherein the detecting comprises detecting movement with an inertial measurement unit.

8. The system of claim 1, wherein the detecting comprises detecting sound with a microphone.

9. The system of claim 1, wherein the attribute comprises at least one of a direction or a magnitude of the movement.

10. The system of claim 1, wherein the machine-readable instructions cause the processor to perform operations further comprising:

receiving a training data set comprising a plurality of vibration data and a plurality of attributes corresponding to the plurality of vibration data; and training a machine learning model based on the training data set; wherein:

the determining the attribute of the movement based on the detected signals is based on the trained machine learning model.

11. A robotic arm comprising:

a processor;

an end effector comprising a plurality of ridges;

a sensor configured to detect vibrations from the plurality of ridges, wherein a thickness of the plurality of ridges varies along at least one axis;

an output device configured to produce vibrations within the end effector; and a non-transitory memory module storing machine-readable instructions that cause the processor to perform operations comprising:

contacting, with the plurality of ridges, a target object;

outputting the vibration from the output device to amplify the vibrations from the plurality of ridges;

detecting, with the sensor, vibrations from the plurality of ridges caused by a movement between the target object and the plurality of ridges;

determining an attribute of the movement based on the detected signals; and adjusting the end effector based on the attribute of the movement.

12. The robotic arm of claim 11, wherein the plurality of ridges are a non-uniformly distributed group of lines extending from a surface of the end effector.

13. The robotic arm of claim 11, wherein the plurality of ridges are a uniformly distributed group of lines extending from a surface of the end effector.

14. The robotic arm of claim 11, wherein a surface of the end effector forms the plurality of ridges.

15. The robotic arm of claim 11, wherein the attribute comprises at least one of a direction or a magnitude of the movement.

16. The robotic arm of claim 11, wherein the machine-readable instructions cause the processor to perform operations further comprising:

receiving a training data set comprising a plurality of vibration data and a plurality of attributes corresponding to the plurality of vibration data; and training a machine learning model based on the training data set; wherein:

the determining the attribute of the movement based on the detected signals is based on the trained machine learning model.

17. An end effector comprising:

a plurality of ridges;

a sensor configured to detect vibrations from the plurality of ridges, wherein a thickness of the plurality of ridges varies along at least one axis;

an output device configured to produce a vibration over a range of frequencies; and a controller configured to perform operations comprising:

contacting, with the plurality of ridges, a target object;

detecting, with the sensor, vibrations from the plurality of ridges caused by a movement between the target object and the plurality of ridges, wherein one or more frequencies of the range of frequencies amplifies a frequency of the vibrations;

determining an attribute of the movement based on the detected signals; and adjusting the end effector based on the attribute of the movement.

18. The end effector of claim 17, wherein the plurality of ridges has a saw wave configuration.

* * * * *